United States Patent [19]

Le Maitre et al.

[11] Patent Number: 4,737,010
[45] Date of Patent: Apr. 12, 1988

[54] SPREADER HEAD FOR AN OPTICAL FIBER CABLE

[75] Inventors: Patrick Le Maitre, La Grange Saint Louis; Jean-Claude Resbeut, Saint Ouen L'Aumone, both of France

[73] Assignee: Les Cables de Lyon, France

[21] Appl. No.: 919,397

[22] Filed: Oct. 16, 1986

[30] Foreign Application Priority Data

Oct. 16, 1985 [FR] France .............................. 85 15342

[51] Int. Cl.⁴ .............................................. G02B 6/36
[52] U.S. Cl. ................................ 350/96.20; 350/96.23
[58] Field of Search ......................... 350/96.20, 96.23

[56] References Cited

U.S. PATENT DOCUMENTS 4,261,640  4/1981  Stankos et al. ............... 350/96.2 X
4,359,262  11/1982  Dolan ............................ 350/96.2

FOREIGN PATENT DOCUMENTS 0017319  2/1980  European Pat. Off. .
0063506  3/1982  European Pat. Off. .
0051510  5/1982  European Pat. Off. ........... 350/96.2
2534700  4/1984  France .......................... 350/96.23
55-138066  10/1980  Japan .
57-160797  9/1982  Japan .
0158609  9/1983  Japan .......................... 350/96.23
0061704  4/1985  Japan .......................... 350/96.2
1470890  8/1974  United Kingdom .

Primary Examiner—John Lee
Assistant Examiner—John Ngo
Attorney, Agent, or Firm—Sughrue, Mion, Zinn, Macpeak & Seas

[57] ABSTRACT

A spreader head for an optical fiber cable, the cable (10) comprising a central grooved core (11) with each groove (12) receiving a bundle (13) of optical fibers, the spreader head being constituted by a support part (20) surrounded by a ring (21) having outwardly open recesses disposed around its periphery and each receiving a cylinder (30), with each cylinder having at least as many axial orifices as there are optical fibers to a single bundle of optical fibers, and with each axial orifice having an optical fiber passing therethrough being extended by a flexible tube (50) for surrounding and protecting the corresponding optical fiber.

6 Claims, 2 Drawing Sheets

SPREADER HEAD FOR AN OPTICAL FIBER CABLE

The present invention relates to a spreader head for an optical fiber cable, with the cable being constituted by a central grooved core with each groove receiving a bundle of optical fibers.

BACKGROUND OF THE INVENTION

When the end of an optical fiber cable is connected to another cable or to other equipment, it is necessary for the cable to be spread out into individual optical fibers and for each individual optical fiber to be protected by means of a respective flexible tube in order to enable the fibers to be identified by the use of appropriately colored tubes.

Spreader heads exist for spreading out the fiber bundles of a cable, with each bundle being received in a flexible protective tube. Other spreader heads also exist for spreading out the individual optical fibers of a bundle as received in each of said flexible protective tubes.

It is thus necessary to use two different spreader heads in order to fully spread out the optical fibers of a cable.

preferred embodiments of the present invention enable an optical fiber cable to be spread out directly into individual optical fibers.

Such preferred embodiments of the present invention also make such a cable highly flexible in use during various repair and other operations which may be performed on the cable and additionally they make use of components which are common to various different sizes of cable head and to various different cable configurations, together with other components which are specially adapted to a given size of cable head or to a given cable configuration.

SUMMARY OF THE INVENTION

The present invention provides a spreader head for an optical fiber cable, the cable comprising a central grooved core with each groove receiving a bundle of optical fibers, the spreader head being constituted by a support part surrounded by a ring having outwardly open recesses disposed around its periphery and each receiving a cylinder, with each cylinder having at least as many axial orifices as there are optical fibers to a single bundle of optical fibers, and with each axial orifice having an optical fiber passing therethrough being extended by a flexible tube for surrounding and protecting the corresponding optical fiber.

In addition, a spreader head preferably includes at least one of the following features:

each recess receives a centering peg which engages into a corresponding orifice in the cylinder received in the recess;

said head is covered by two half-shells, with at least one of said half-shells including a projection for preventing it from rotating;

the ring of the support part extends axially ir the form of a cable-holding tube, with said tube having a pointed screw passing radially therethrough to lock the axial position of the cable relative thereto.

BRIEF DESCRIPTION OF THE DRAWINGS

A spreader head for a 10-groove optical fiber cable having a bundle of four fibers in each groove is described by way of example with reference to the accompanying drawings, in which.

MORE DETAILED DESCRIPTION

Figure 1:
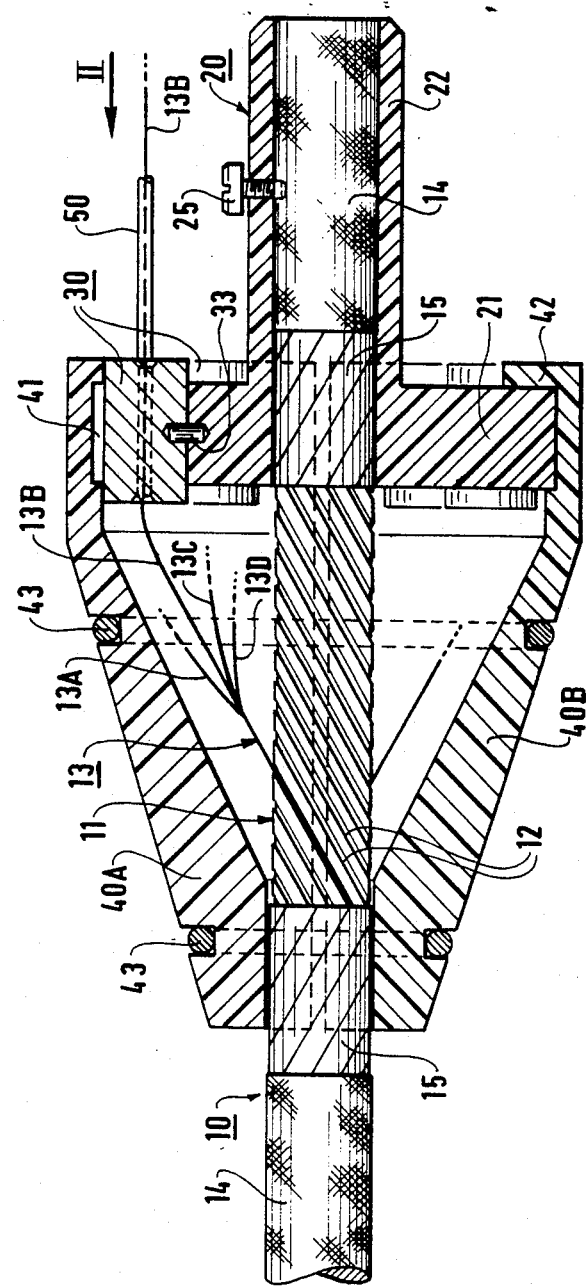
FIG. 1 is a longitudinal section through a complete spreader head on a line I—I of FIG. 2.

FIG. 1 shows a completed spreader head with a cable fully mounted thereon.

In the figure a cable 10 is connected to a spreader head which is essentially constituted by three main components: a support part 20, a plurality of cylinders 30, and two half-shells 40. There are also numerous protective flexible tubes 50. The cable 10 comprises a core 11 having ten helical grooves 12 (which grooves could alternatively follow an alternating or sinuous pitch), with each groove receiving a bundle 13 of optical fibers. During manufacture, the cable is fitted with a protective covering 14, but the covering is removed over a length which is substantially equal to the length of the head. Each end of the protective covering on either side of the window formed therein is held in place by binding 15.

Figure 2:
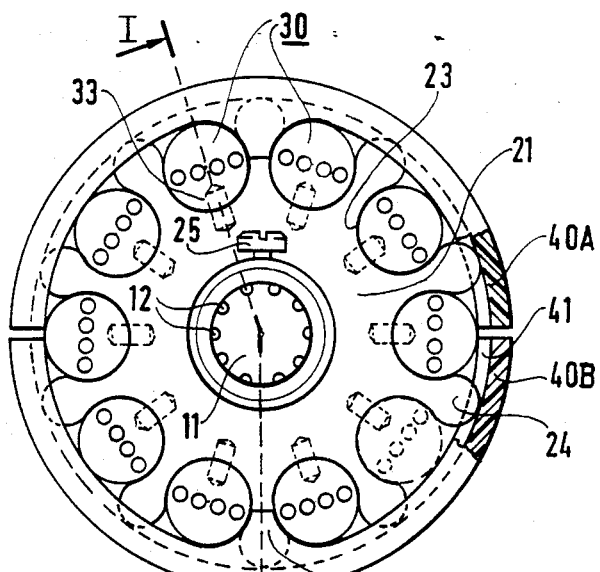
FIG. 2 is a partially cutaway end view of the FIG. 1 head seen along arrow II.

The support part 20 comprises two main portions, a ring 21 having cylindrical cross section recesses 23 which are seen more clearly in FIG. 2, and a holding tube 22 into which the cable 10 is threaded, with the tube receiving a pointed screw 25 for locking the axial position of the cable.

Each recess 23 receives a corresponding cylinder 30 and each cylinder is prevented from rotating by a corresponding peg 33.

Each cylinder 30 has a plurality of spaced orifices 31 including inlets 31A or receiving individual fibers of a bundle 13 constituted by four optical fibers 13A, 13B, 13C and 13D, and outlets fitted with four respective protective flexible tubes 50 each of which encloses a single optical fiber. In FIG. 1, the outlet side is shown with only the optical fiber 13B and its tube 50.

The head is covered by two half-shells 40 eaoh of which bears at one end on binding 15 and at the other end on the cylinders 30. The two half-shells 40 are held together by two collars 43. Each of the half-shells includes a groove 41 for receiving rounded portions 24 of "petals" defining the periphery of the ring 21.

FIG. 2 shows the shape of the ring 21 with its ten recesses 23, and with each adjacent pair of recesses 23 being separated by a rounded radially projecting portion 24 of the ring 21.

The recesses 23 and the rounded portions 24 give the ring a "daisy" shape with pairs of adjacent "petals" which are sufficiently flexible to receive the cylinders 30 in the recesses 23 by snap-fastening.

FIG. 2 also shows the two half-shells 40 bearing against the cylinders 30 and the partially cutaway portion shows how the rounded portions 24 of "petals" at the periphery of the ring 21 is received in the groove 41 of the half-shells 40. These half-shells 40 each include a projection 42 (also visible in FIG. 1) which fits between two adjacent cylinders 30, said projections preventing the half-shells from rotating.

Figure 3:
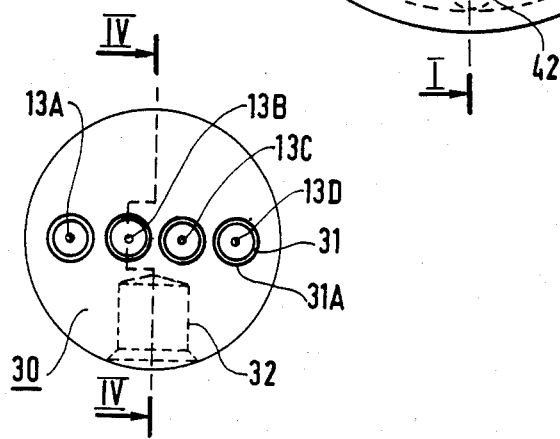
FIG. 3 is a front view of a single cylinder.

FIG. 3 shows a single cylinder 30 in greater detail with four orifices 31 having corresponding chamfered inlets 31A. Each of these four orifices encloses a corresponding optical fiber, i.e. optical fibers 13A, 13B, 13C, and 13D of the bundle 13.

Each cylinder also includes a blind, radial hole 32 for receiving a centering peg 33. It will be understood that if each bundle includes more than four fibers, each cylinder could include other longitudinally extending orifices 31 for receiving the extra fibers, so long as the orifices avoid the region occupied by the blind hole 32.

Figure 4:
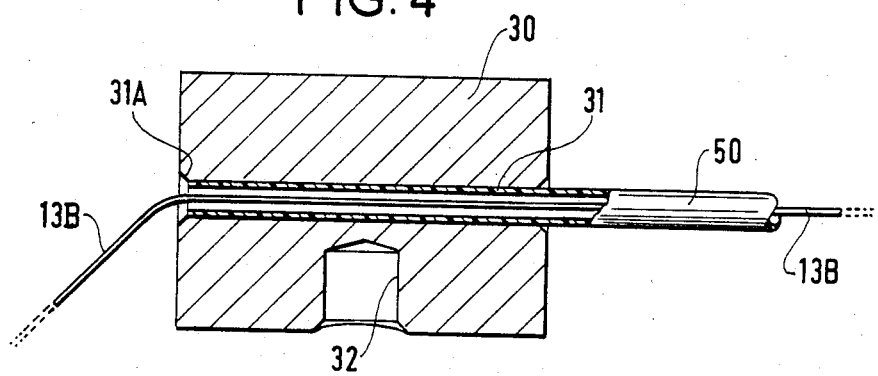
FIG. 4 is a longitudinal section on line IV of the cylinder shown in FIG. 3.

FIG. 4 shows the position of a flexible tube 50 inside an orifice 31 through a cylinder 30. The tube 50 runs along practically the entire length of the orifice and it may be held in place by gluing, for example.

It may be observed in FIG. 1 that the axial extent of each cylinder is greater than the corresponding width of the ring and that therefore each end of each cylinder projects slightly beyond the corresponding face of the ring, thereby facilitating extraction by means of a suitable tool.

A cable is spread out as follows:

the cable to be spread out is prepared by removing its protective covering 14 from a portion whose length is substantially equal to the lenqth of the spreader head, and this bare portion of cable is provided at a distance from the end of the cable which corresponds to the lengths of the optical fibers which are to be inserted into the flexible protective tubes;

each end of the bared window of cable is bound at 15 in order to prevent the edges of the protective covering from being damaged;

the support part 20 is threaded over the cable up to the window;

the head is rested on a suitable support (not shown) after all of the tubes 50 have been previously threaded through the corresponding cylinders 30;

each of the fibers from a given bundle is extracted one by one from that bundle and is coiled temporarily into an auxiliary container, and then each of the fibers is threaded into a corresponding tube 50 which is identified by a suitable color code;

once a cylinder has received its quota of fibers it is snap-fitted into a corresponding recess;

the above two operations are repeated for each bundle of fibers;

the pointed screw 24 is screwed home to hold the support part 20 relative to the cable 10;

the end of the cable is cut flush with the end of the support tube 22; and the two half-shells 50 are put into place and then fixed together by means of the two collars 43.

We claim:

1. A spreader head for an optical fiber cable, the cable comprising a central grooved core with each groove carrying a bundle of optical fibers, the spreader head comprising: a short part having an axial bore, said central grooved core of said optical fiber cable projecting in said support axial bore for concentrically mounting said support part about said central grooved optical fiber cable core, a ring integral with said support, and having an outer periphery, circumferentially spaced radially outwardly open recesses within the outer periphery of said ring, a cylinder mounted coaxially respectively within each radially outwardly open recess of said ring, each cylinder having at least as many longitudinal orifices passing therethrough as there are optical fibers to respective single bundles of optical fibers, each orifice carrying a respective optical fiber of said bundles, and a flexible tube, mounted within each orifice and extending axially beyond said orifice for surrounding and protecting a corresponding optical fiber.

2. A spreader head according to claim 1, wherein said radially outwardly open recesses of said spreader head are of cylindrical cross section sized to the diameter of the cylinder carried thereby and wherein, said spreader head carries a centering peg projecting radially outwardly thereof at each recess, each cylinder carries a corresponding radial orifice sized to the centering peg and receiving the same to prevent rotation of the cylinder within the cylindrical recesses.

3. A spreader head according to claim 1, further comprising two semi-cylindrical half-shells surrounding said optical fiber cable and said support part and ring, means for clamping said half-shells together and about said optical fiber cable, said support and said ring and wherein, and at least one of said half-shells including a radially inward projection interposed between two adjacent cylinders for preventing said half-shells from rotating about said optical fiber cable, said support and said ring.

4. A spreader head according to claim 1, wheren said support part extends axially beyond said ring in the form of a cable-holding tube concentric about said optical fiber cable grooved core and said tube including a pointed screw, threaded to said tube and passing radially therethrough to lock the axial position of the cable relative thereto.

5. A spreader head as claimed in claim 1, wherein said ring, concentric with said support part, includes radially projecting, flexible "daisy" shape petals terminating in rounded ends defined by said cylindrical recesses and wherein, each of said cylinders is snap fitted into the radially outwardly open recess formed by said flexible petals, half-shells forming a covering for said head which is of generally conical form, having one end bearing on a binding of said optical fiber cable and another end bearing on said cylinders, and wherein the end of the half-shells bearing on said cylinders includes a circumferential groove receiving the rounded portions of said "daisy" shape ring "petals".

6. The spreader head as claimed in claim 5, wherein a pair of longitudinally spaced collars concentrically surround said half-shells and hold said half-shells together, secured at respective ends to said optical fiber cable and said cylinders, said ring and said support.

* * * * *